(12) United States Patent
Olson

(10) Patent No.: US 8,523,719 B1
(45) Date of Patent: Sep. 3, 2013

(54) HELICAL TENSIONER FOR TENSION MEMBERS

(76) Inventor: Billy Olson, Tempe, AZ (US)

(*) Notice: Subject to any disclaimer, the term of this patent is extended or adjusted under 35 U.S.C. 154(b) by 1785 days.

(21) Appl. No.: 11/533,107

(22) Filed: Sep. 19, 2006

(51) Int. Cl.
*H02G 7/02* (2006.01)
(52) U.S. Cl.
USPC .............. 474/101; 174/40 TD; 174/45 TD
(58) Field of Classification Search
USPC .... 474/101; 174/40 TD, 45 TD; 74/501.5 R
See application file for complete search history.

(56) References Cited

U.S. PATENT DOCUMENTS

| | | |
|---|---|---|
| 1,200,076 A | 10/1916 | Burgess |
| 2,052,541 A | 8/1936 | Roberts et al. |
| 2,423,211 A | 7/1947 | Vanselow |
| 2,610,633 A * | 9/1952 | Jozwik ............................ 460/34 |
| 2,736,398 A | 2/1956 | Peterson |
| 3,069,491 A | 12/1962 | Hayden et al. |
| 3,163,706 A | 12/1964 | Peterson |
| 3,250,515 A | 5/1966 | Hudnall et al. |
| 3,251,161 A | 5/1966 | Stirn |
| 3,302,346 A | 2/1967 | Williams et al. |
| 3,801,726 A | 4/1974 | Kurihara et al. |
| 3,899,629 A | 8/1975 | Hawkins |
| 6,372,984 B1 | 4/2002 | Wang |
| 6,646,208 B1 | 11/2003 | Tseng |

FOREIGN PATENT DOCUMENTS

| | | | |
|---|---|---|---|
| GB | 2245432 A | * | 1/1992 |
| JP | 01110012 A | * | 4/1989 |

OTHER PUBLICATIONS

Official English translation of JP 1-110012.*

* cited by examiner

*Primary Examiner* — Robert A Siconolfi
*Assistant Examiner* — Vu Q Nguyen
(74) *Attorney, Agent, or Firm* — Eckert Seamans Cherin & Mellott, LLC; David C. Jenkins

(57) ABSTRACT

A tensioner structured to shorten the effective length of a tension member is provided. The tensioner has a body with an outer surface and a generally helical path on the outer surface. The tension member is wrapped around the tensioner body and retained in the path. In this configuration, the tensioner acts to retain a first length of the tension member within a second, shorter length corresponding to the length of the tensioner body. When the effective length of a tension member is reduced, the amount of sag in the tension member is reduced.

19 Claims, 4 Drawing Sheets

HELICAL TENSIONER FOR TENSION MEMBERS

BACKGROUND OF THE INVENTION

1. Field of the Invention

This invention relates to tension members, such as, but not limited to power lines, and, more specifically, to a tensioner structured to reduce the amount of sag in a suspended tension member.

2. Background Information

A tension member is any type of body that is substantially rigid when in tension but not substantially rigid when compressed. One of the most common types of tension member is a power line suspended between two towers or poles. Other tension members include, but are not limited to, guy wires, suspended telephone lines, cordage on a ship, or any other suspended rope, cable, cord, or chain. Tension members may be placed under an external tension, such as a guy wire used to support a tower, or the tension may be created by the weight of the tension member itself, such as the aforementioned power line suspended between two towers. With regard to the latter, a suspended tension member generally has a certain amount of sag between the two support points. The greater the length of the tension member relative to the distance between the two support points, the greater the amount of the sag. That is, given two support points set at a fixed distance from each other, a tension member of a first length, which is greater than the fixed distance, sags a set distance relative to a straight line between the two points. Another tension member having a second length that is greater than the first length will sag a greater distance relative to a straight line between the two points than the first tension member. As is known in the art, in addition to the length of the tension member relative to the distance between the two support points, the amount of sag is also controlled by various factors such as, but not limited to, the elasticity and temperature of the tension member.

The sag of a suspended tension member may be a disadvantage, such as when a power line sags to a point in proximity with a structure, tree, or another power line. While the amount of sag may be calculated, or observed, when the tension member is installed, the acceptable amount of sag may change over time. For example, a new building or other structure below the power line may be built, a tree or other foliage may grow to be too close to the power line, or the electrical capacity required of the line may change. Thus, what was once an acceptable amount of sag may become unacceptable. One option in such situations is to replace the entire tension member. This option can be time consuming and expensive.

There is, therefore, a need for a tensioner structured to take up the sag within a tension member that is installed between two points.

There is a further need for a tensioner that may be easily installed and removed.

There is a further need for a tensioner that is inexpensive.

SUMMARY OF THE INVENTION

These needs, and others, are met by at least one embodiment of this invention which provides a tensioner having a body with an outer surface and a generally helical path on the outer surface. The tension member is wrapped around the tensioner body and retained in the path. In this configuration, the tensioner acts to retain a first length of the tension member within a second, shorter length. As such, the amount of sag in the tension member is reduced. That is, the tensioner effectively shortens the tension member with respect to the length of the tension member that is free to sag. As noted above, when the distance between the two support points is fixed, a shorter tension member sags less than a longer tension member.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, the phrase "effective length" when used in reference to a tension member means the portion of the tension member that is free to sag.

As used herein, "pitch" when used in reference to a path about a body means the number of revolutions about that body over a standard length, typically inches. Thus, a pitch of 1.0 rev/in. means that over a length of one inch, the path extends 360 degrees about the body. Conversely, a pitch of 0.25 rev/in. means that over a length of one inch, the path extends 90 degrees about the body and a pitch of 0.5 rev/in. means that over a length of one inch, the path extends 180 degrees about the body. The "pitch", with respect to the tensioner 30 (described below), may be either "clockwise" or "counter-clockwise". That is, "clockwise" or "counter-clockwise," with respect to an axis of rotation, describe the direction of rotation along the transverse of the axis. As shown in the Figures, the pitch transverses the tensioner 30 in a "clockwise" manner.

Figure 1:
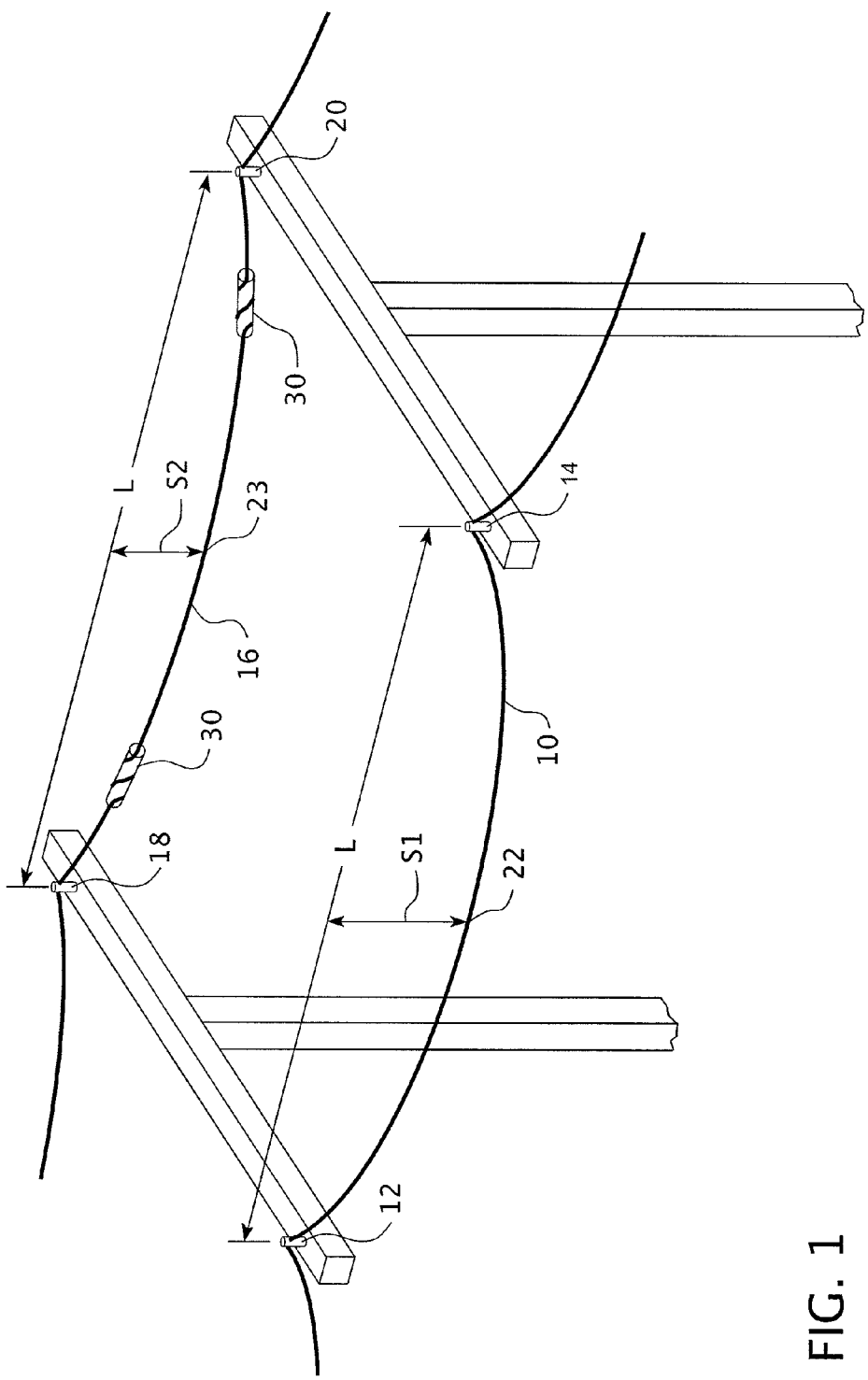
FIG. 1 is an isometric view of tension members suspended between two points.
Figure 2:
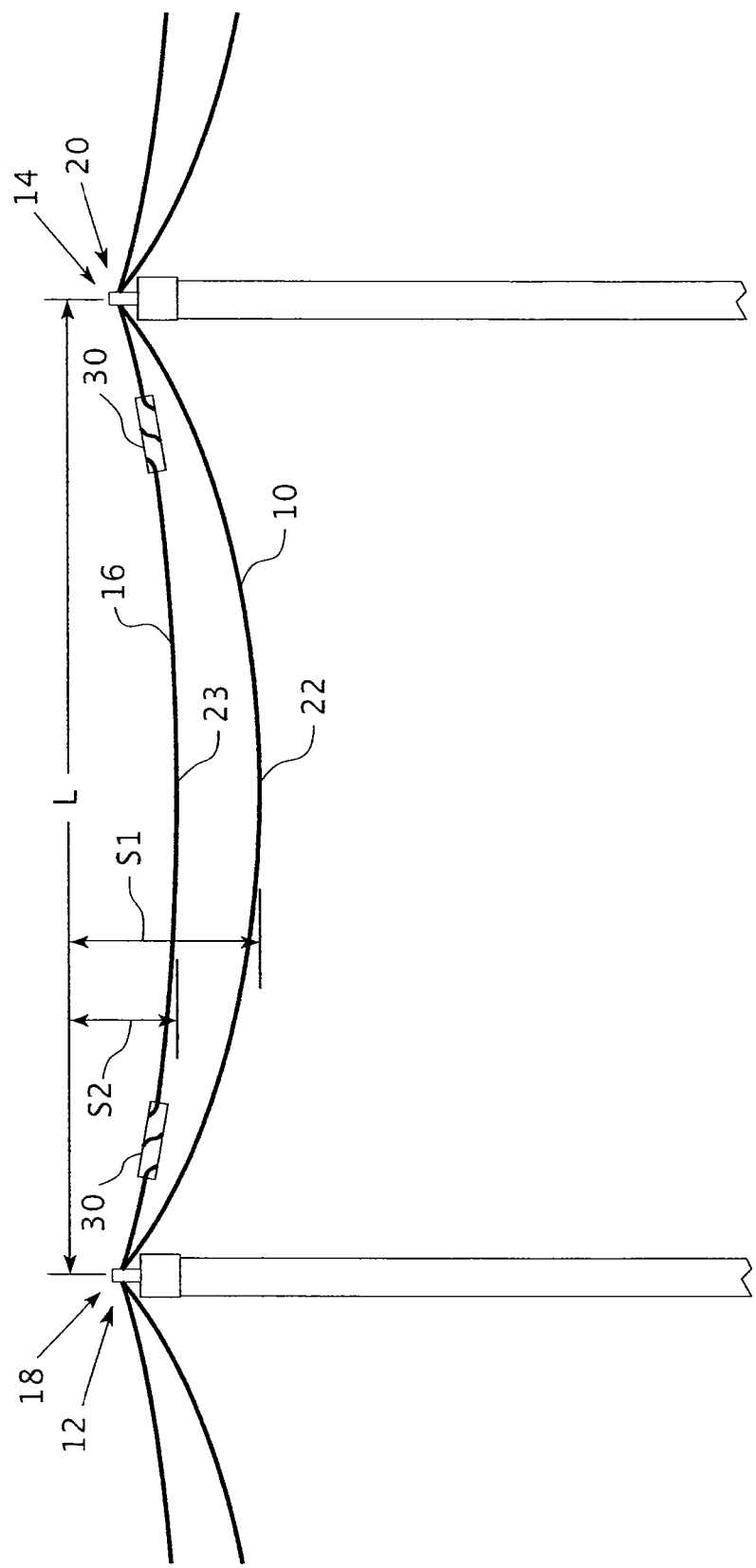
FIG. 2 is a schematic side view of tension members suspended between two points.

As shown in FIGS. 1 and 2, an unencumbered tension member 10 is suspended between a first pair of spaced apart points 12, 14. Another tension member 16 having at least one tensioner 30, discussed below, is suspended between a second pair of spaced apart points 18, 20. Preferably, the tension members 10, 16 have a generally circular cross-sectional area with a diameter, however, additional material may be removed for weight savings, material savings or improved thermal conductivity properties of the tensioner 30 so long as the described helical path is conserved. The distance, represented by the horizontal line "L," between the points 12, 14 in the first pair of spaced apart points 12, 14 is about the same as the distance between the points 18, 20 in the second pair of spaced apart points 18, 20. The first tension member 10 and the second tension member 16 have the same length. The entire length of the first tension member 10 is free to sag. Thus, the effective length of the first tension member 10 is equivalent to the total length of the first tension member 10. A medial point 22 on the first tension member 10 sags a distance, represented by line "S1," below the horizontal line L. As set forth in greater detail below, the second tension member 16 includes at least one tensioner 30. The tensioner 30 is structured to reduce the effective length of the second tension member 16. Thus, a medial point 23 on the second tension member 16 sags a distance, represented by line "S2," below the horizontal line L. Because the effective length of the second tension member 16 is less than the effective length of the first tension member 10, the amount of sag of the second tension member 16 is reduced relative to the first tension member 10. The first tension member 10 is shown so as to make a comparison with the second tension member 16. An unencumbered tension member 10 is not required to practice this invention.

Figure 3:
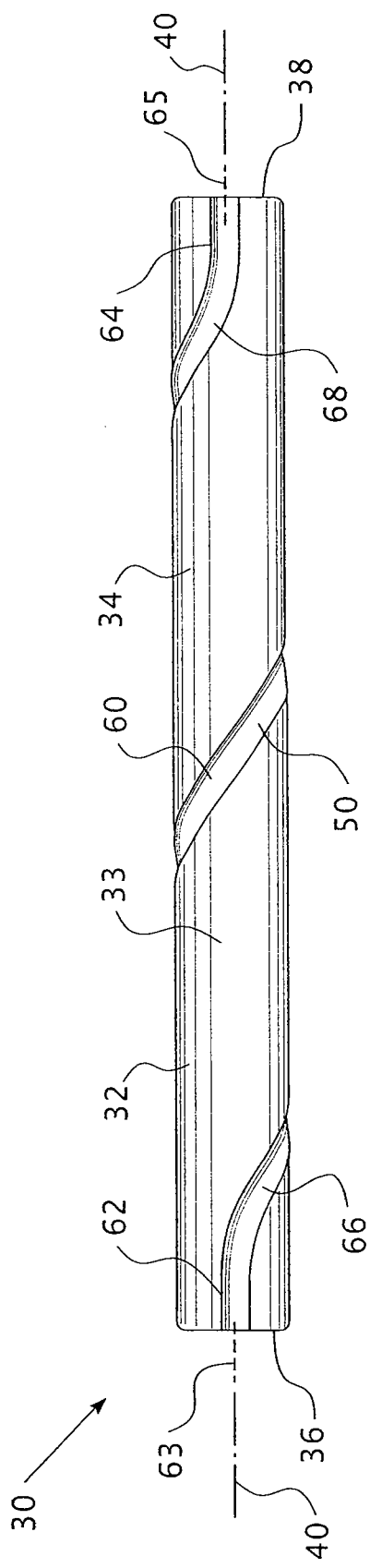
FIG. 3 is a top view of a tensioner.
Figure 4:
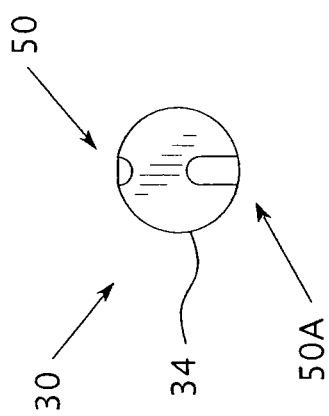
FIG. 4 is an end view of a tensioner.

As shown in FIGS. 3 and 4, the tensioner 30 includes an elongated body 32, preferably a cylindrical body 32, having an outer surface 34, a first end 36, a second end 38, and a longitudinal axis 40. The body 32 may also include one or more generally flat platforms and openings or bores (not shown) structured to be engaged by an installation tool set. The length of the tensioner 30 is less than the length of the tension member 16. A generally helical path 50 is disposed on the body outer surface 34. The helical path 50 is sized to accommodate at least a portion of the length of the tension member 16. As described below, the tension member 16 is wrapped around the body 32 and retained in the path 50. In this configuration, the tensioner 30 acts to retain a first length of the tension member 16 within a second, shorter length corresponding to the length of the body 32. The helical path 50, and more specifically the center of the helical path 50, has a "diameter" relative to the center of the cylindrical body 32.

Further, the helical path 50, preferably, has a cross-sectional shape that corresponds to at least a portion of the cross-sectional shape of the tension member 16. Thus, in an embodiment wherein the tension member 16 has a circular cross-sectional area, the helical path 50 has bottom that is a circular segment shaped cross-sectional area. The helical path 50 may be less deep than the diameter of the tension member 16 and, in this configuration, the helical path 50 has only a circular segment shaped cross-sectional area (FIG. 4). Alternately, the helical path 50A may be deeper than the diameter of the tension member 16. In this configuration, the bottom of the helical path 50A is a circular segment shaped cross-sectional area extending over 180 degrees. Further, in this embodiment, the sides of the helical path 50A are generally parallel and extend generally tangent to each side of the circular segment shaped cross-sectional area at the bottom of the helical path 50A.

The helical path 50 extends about the body 32 at pitch. For example, if the tension member 16 is a 795 Kcmil ACSR 45/7 "TERN" power line having a diameter of about 1.063 in., the pitch of the helical path 50 is between about 0.04 and 0.06 rev./in., and more preferably about 0.0556 rev./in. Further, for use on such a power line, the body 32 has a length of between about 30 and 40 inches, and more preferably about 36.0 inches. The diameter of the helical path 50 is between about 2.5 and 4.0 inches, and more preferably about 3.0 inches. The diameter of the body 32, which is always larger than the diameter of the helical path 50, is between 2.75 and 5.0 inches, and more preferably about 3.5 inches. Thus, in the preferred embodiment, where the body 32 has a length of 36.0 inches, the pitch is 0.0556 rev./in., and the diameter of the helical path is 3.0 inches, the helical path 50 has a length of about 40.5 inches. The length of the helical path 50 is, by definition, longer than the length of the tensioner 30, i.e., 36.0 inches.

With a tensioner 30 in this configuration, a portion of the length of the tension member 16 may be wrapped around the body 32 with the tension member 16 cross-sectional shape being at least partially disposed within the helical path 50. Alternately, if the helical path 50A is deeper than the diameter of the tension member 16, the tension member 16 cross-sectional shape is entirely disposed within the helical path 50A. The length of the portion of the tension member 16 disposed in the helical path 50 is equivalent to the length of the helical path 50. As noted above, the length of the helical path 50 is, by definition, longer than the length of the tensioner 30. Thus, the effective length of the second tension member 16 is reduced. When the effective length of the tension member 16 is reduced there is a corresponding reduction in the sag of the tension member 16. The sag of the tension member 16 may be further reduced by installing multiple tensioners 30 on the tension member 16.

In one embodiment of the tensioner 30, the generally helical path 50 includes a helical portion 60 and at least one, and preferably a first and second, elongated axial path 62, 64. Each axial path 62, 64 has a longitudinal axis 63, 65. Each axial path 62, 64 is, preferably, disposed at each end 36, 38 of the body 32. Each axial path 62, 64 extends generally parallel to the body longitudinal axis 40. Between each axial path 62, 64 and the helical portion 60 is a transition path 66, 68. Because some tension members 10, 16 have limited flexibility, the transition path 66, 68 allows for a defined transition between the generally straight portion of the tension member 16 located in the axial path 62, 64 and the generally helical portion 60 of the second tension member 16 located in the helical portion 60. Further, it is generally desirable to have the body 32 hang below the second tension member 16 when installed. To accomplish this, the first axial path longitudinal axis 63 and the second axial path longitudinal axis 65 are generally aligned with each other on the body outer surface 34. In this configuration, when the tensioner 30 is installed, the weight of the body 32 will typically twist the second tension member 16 until the body 32 is disposed generally below the tension member 16. Thus, the axial paths 62, 64 may be said to be on an upper side 33 of the body 32.

Alternately, if the helical path 50 does not have any axial paths 62, 64, the helical path 50 is preferably constructed so that the number of revolutions about the body 32 is an integer. That is, the helical path 50 may be constructed so that the tip of the helical path 50 at the body first end 36 is generally aligned with the tip of the helical path 50 at the body second end 38. Again, in this configuration, when the tensioner 30 is installed, the weight of the body 32 will typically twist the tension member 16 until the body 32 is disposed generally below the tension member 16. Thus, tips of the helical path 50 may be said to be on an upper side 33 of the body 32. In certain situations, however, the position of the body 32 relative to the tension member 16 is not important and the tip of the helical path 50 at the body first end 36 does not have to be generally aligned with the tip of the helical path 50 at the body second end 38. That is, the number of revolutions about the body 32 made by the helical path 50 is not an integer.

Figure 5:
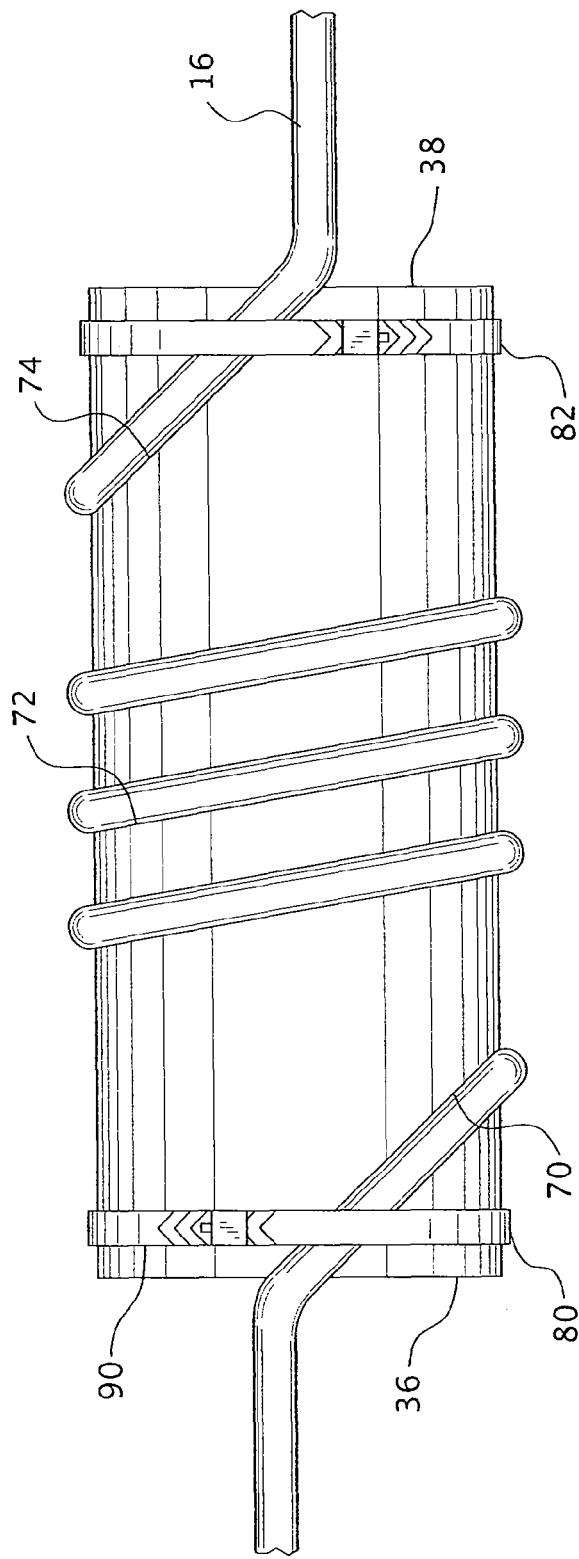
FIG. 5 is a top view of an alternate embodiment of the tensioner.

The generally helical path 50 may also include at least two portions 70, 72 each having different pitch. That is, as shown in FIG. 5, the helical path 50 may have a first portion 70 with a first pitch and a second portion 72 with a second pitch. Preferably, the helical path 50 is symmetrical and, as such, there is preferably a third portion 74 having generally the same pitch as the first portion 70. Alternately, the pitch may gradually change over the length of the body 32. Again, in a preferred embodiment, the degree of pitch of the helical path 50 is generally symmetric about a medial point on the body 32.

The tensioner 30 may also include at least one, and preferably a first and second, clamping device 80, 82. The clamping devices 80, 82 are structured to bias the portion of the tension member 16 that engages the tensioner 30 toward the bottom of the helical path 50. The clamping devices 80, 82 may be, but are not limited to, a tightenable band 90 structured to be disposed about the body 32 and any portion of the tension member 16 that extends above the helical path 50.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A tensioner for an elongated tension member suspended between two points, said tension member having a length, a cross-sectional shape, wherein said tension member has a generally circular cross-sectional area with a diameter, and a sag, said tensioner comprising:
    an elongated body having an outer surface, a first end, a second end and a longitudinal axis;
    a generally helical path disposed on said body outer surface, said helical path sized to accommodate at least a portion of said tension member, said helical path being less deep than the diameter of the tension member;
    wherein a portion of the length of said tension member may be disposed along said helical path, said tension member cross-sectional shape being at least partially disposed within said helical path; and
    wherein the sag of said tension member is reduced.

2. The tensioner of claim 1 wherein said body is generally cylindrical.

3. The tensioner of claim 2 wherein:
    said helical path includes at least one axial path; and
    said at least one axial path extending generally parallel to said body longitudinal axis and disposed at said body first end.

4. The tensioner of claim 2 wherein:
    said helical path includes a first axial path and a second axial path;
    each said axial path extending generally parallel to said body longitudinal axis;
    said first axial path disposed at said body first end; and
    said second axial path disposed at said body second end.

5. The tensioner of claim 4 wherein:
    said first axial path and said second axial path each have a longitudinal axis; and
    said first axial path longitudinal axis and said second axial path longitudinal axis being generally aligned with each other on said body outer surface.

6. The tensioner of claim 4 wherein:
    said body has an upper side; and
    said first axial path and said second axial path are disposed on said body upper side.

7. The tensioner of claim 1 wherein said tension member has a generally circular cross-sectional area with a diameter, and wherein said helical path has a circular segment shaped cross-sectional area.

8. The tensioner of claim 1 wherein said helical path has a generally constant pitch.

9. The tensioner of claim 1 wherein said helical path includes a number of revolutions about said body, said number of revolutions being an integer.

10. A tensioner for an elongated tension member suspended between two points, said tension member having a length, a cross-sectional shape, wherein said tension member has a generally circular cross-sectional area with a diameter, and a sag, said tensioner comprising:
    an elongated body having an outer surface, a first end, a second end and a longitudinal axis;
    a generally helical path disposed on said body outer surface, said helical path sized to accommodate at least a portion of said tension member, said helical path being less deep than the diameter of the tension member;
    wherein a portion of the length of said tension member may be disposed along said helical path, said tension member cross-sectional shape being at least partially disposed within said helical path;
    wherein the sag of said tension member is reduced;
    said helical path has at least two portions including a first portion and a second portion;
    said first portion having a first pitch; and
    said second portion having a second pitch.

11. The tensioner of claim 10 wherein:
    said at least two portions further includes a third portion; and
    said third portion having a pitch generally the same as the pitch of said first portion.

12. A tensioner for an elongated tension member suspended between two points, said tension member having a sag and a cross-sectional shape, wherein said tension member has a generally circular cross-sectional area with a diameter, said tensioner comprising:
    an elongated body having an outer surface, a first end, a second end and a longitudinal axis;
    a generally helical path disposed on said body outer surface, said helical path sized to accommodate at least a portion of said tension member, said helical path being less deep than the diameter of the tension member;
    at least one clamping device, said clamping device structured to retain said tension member in said helical path;
    wherein a portion of said tension member may be disposed along said helical path, said tension member cross-sectional shape being at least partially disposed within said helical path; and
    wherein the sag of said tension member is reduced.

13. The tensioner of claim 12 wherein said at least one clamping device is a tightenable band structured to bias said tension member toward the bottom of said helical path.

14. A tensioner for an elongated tension member suspended between two points, said tension member having a sag and a cross-sectional shape, wherein said tension member has a generally circular cross-sectional area with a diameter, said tensioner comprising:
    an elongated body having an outer surface, a first end, a second end and a longitudinal axis;
    a generally helical path disposed on said body outer surface, said helical path sized to accommodate at least a portion of said tension member, said helical path being less deep than the diameter of the tension member;
    at least one clamping device, said clamping device structured to retain said tension member in said helical path;
    wherein a portion of said tension member may be disposed along said helical path, said tension member cross-sectional shape being at least partially disposed within said helical path;
    wherein the sag of said tension member is reduced;
    said at least one clamping device includes a first clamping device and a second clamping device;
    said first clamping device disposed adjacent to said body first end; and
    said second clamping device disposed adjacent to said body second end.

15. The tensioner of claim 14 wherein:
    said helical path includes a first axial path and a second axial path;

each said axial path extending generally parallel to said body longitudinal axis;

said first axial path disposed at said body first end; and said second axial path disposed at said body second end.

16. A tension member comprising:

a first support point;

a second support point;

a tension member extending between said first support point and said second support point, said tension member having a sag and a cross-sectional shape, wherein said tension member has a generally circular cross-sectional area with a diameter;

a tensioner disposed on said tension member, said tensioner having an elongated body with an outer surface, a first end, a second end and a longitudinal axis;

a generally helical path disposed on said body outer surface, said helical path sized to accommodate at least a portion of said tension member, said helical path being less deep than the diameter of the tension member;

at least one clamping device, said clamping device structured to retain said tension member in said helical path;

wherein a portion of said tension member may be disposed along said helical path, said tension member cross-sectional shape being at least partially disposed within said helical path; and wherein the sag of said tension member is reduced.

17. The tension member of claim 16 wherein:

said helical path includes at least one axial path; and said at least one axial path extending generally parallel to said body longitudinal axis and disposed at said body first end.

18. The tension member of claim 16 wherein:

said helical path includes a first axial path and a second axial path;

each said axial path extending generally parallel to said body longitudinal axis;

said first axial path disposed at said body first end; and said second axial path disposed at said body second end.

19. The tension member of claim 18 wherein:

said body has an upper side; and said first axial path and said second axial path each have a longitudinal axis; and said first axial path longitudinal axis and said second axial path longitudinal axis being generally aligned with each other on said body outer surface at said upper side.

* * * * *